United States Patent Office 2,879,742
Patented Mar. 31, 1959

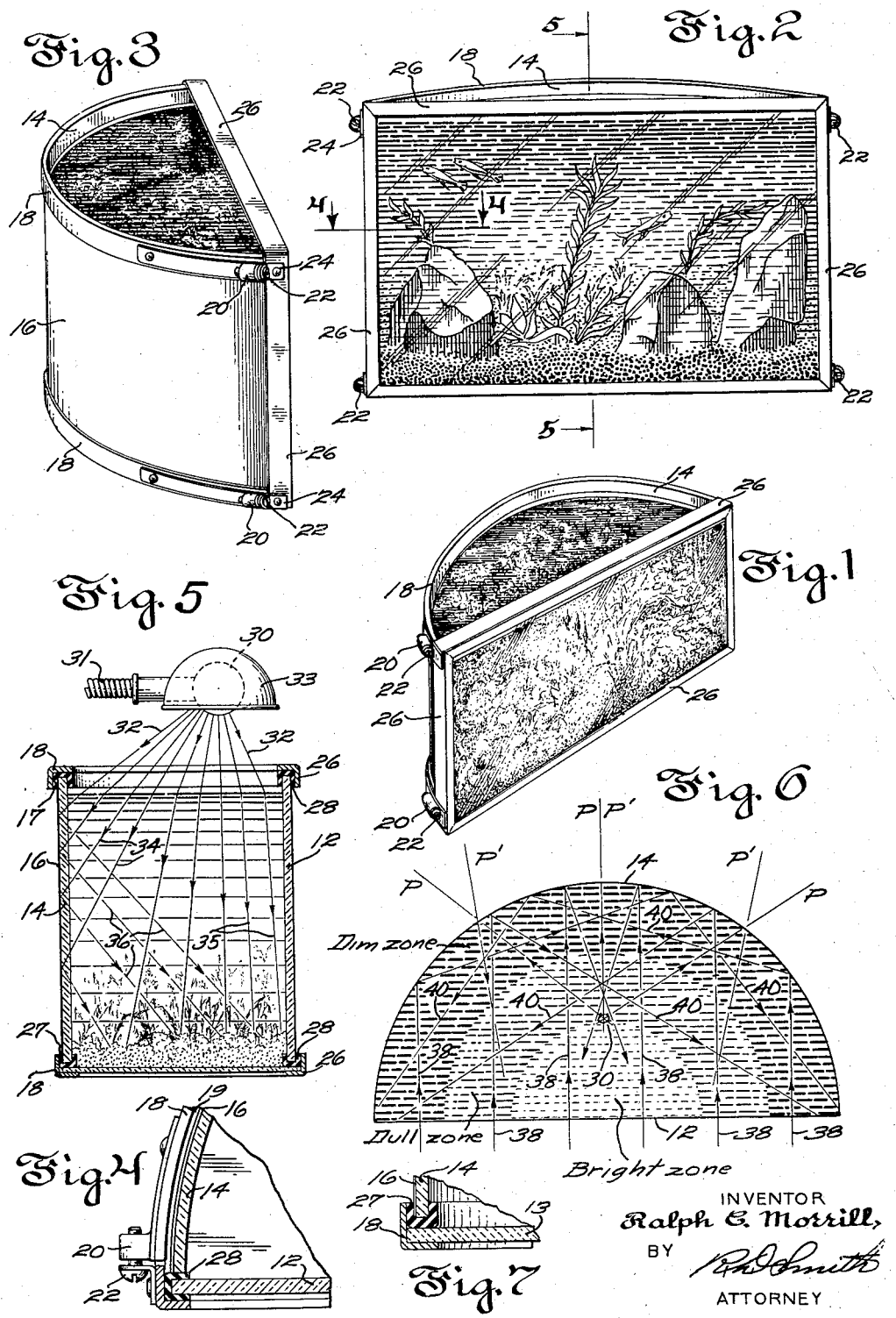

2,879,742

AQUARIUM WITH HABITAT EFFECT

Ralph C. Morrill, New Haven, Conn.

Application November 28, 1956, Serial No. 624,762

4 Claims. (Cl. 119—5)

This invention relates to aquarium tanks for displaying objects submerged in the tank contained water and visible through a transparent upright wall of the tank or through a viewing window located in a front wall of the tank below the surface of the water.

It has been customary to construct aquarium tanks with front side and rear walls that are either planar or outward curving and that may be transparent or opaque. When the walls are opaque, daylight or artificial illumination enters the body of water through its top surface. Where the tank walls are transparent light from the outside can also enter the tank through the walls. As viewed under such formerly prevailing conditions submerged objects, animate or inanimate, have appeared to possess only their true size, proportions and courses of motion while the true boundaries of the tank contained body of water defined by the walls and floor of the tank have been clearly discernible. Hence the appearance of the underwater contents in aquarium tanks as heretofore constructed has borne little or no resemblance to an actual underwater scene as the same would appear to a diver from an underwater viewpoint.

It is an object of this invention to cause submerged inanimate objects as well as submerged moving fish, grasses, etc. to present an appearance, when viewed from outside the tank, that simulates the way they would appear when looked at from an underwater viewpoint.

A contributary object is to attain this result by certain reflection and/or refraction of objective and illuminative light rays that reach the eyes of the observer after passing through the tank confined body of water. The desired effect of such reflection and refraction is to alter the natural appearance of the underwater contents of the tank so as to glamorize them and make their scenic effect more enchanting. Also to multiply the quantity of animate and inanimate objects seeming to appear in the water of the aquarium as well as to diversify their seeming shapes and sizes as they move in courses that differ in distance from the side and rear walls of the tank.

It has been proposed heretofore to provide an aquarium tank with a flat reflective rear wall and a flat transparent front wall, the flat reflective surface of the rear wall facing and paralleling the flat transparent wall while the body of water with its contained swimming fish and/or other underwater inhabitants lies between the front and rear walls. But this formerly proposed arrangement is capable of producing only what is apparent to the eyes of an observer as a combined reflection of the tank contents and of himself, along with recognizable reflections of window lights and other bright objects outside the tank in the background of the observer.

Accordingly a further object of these improvements is to defeat reflection back into the eyes of the observer of nearly all light rays which enter the tank contained body of water from the general position of the observer.

Another object is to concentrate and direct to a common focal region, preferably at a bottom forward position in the submerged contents of the tank, most of the light rays that enter the body of water from a concentrated light source above the top surface thereof. This causes the body of water to decrease in seeming transparency, clarity and brightness progressively with increasing distance back from the front or viewing wall of the tank. It produces an appearance that the tank contained body of water extends without limit into the distance away from the eyes of the observer such as the appearance which characterizes a natural underwater scene when viewed from under the surface of the water.

The foregoing and other objects of the invention will become clearer in detail from the following description of a successful embodiment of the improvements having reference to the accompanying drawings wherein:

Fig. 1 is a perspective view of an aquarium tank constructed to embody the invention.

Fig. 2 is a front view drawn to an enlarged scale looking at the tank from a slightly higher level than the top thereof.

Fig. 3 is a perspective view looking downward at the tank from one side thereof.

Fig. 4 is a fragmentary view on an enlarged scale taken in section on the horizontal plane 4—4 in Fig. 2 showing details of construction.

Fig. 5 is a modified view showing the tank in section on plane 5—5 in Fig. 2 looking in the direction of the arrows indicating graphically a pattern of refraction and reflection of certain light rays from a concentrated source that pass through the tank contained body of water.

Fig. 6 is a diagrammatic plan view of the tank demonstrating reflection of light rays that enter the tank through its transparent front wall.

Fig. 7 is a fragmentary enlarged view of a lower corner of the tank shown in Fig. 5.

My improved aquarium tank can have constructions of various types characterized by certain optical principles that reside in the invention as defined by the appended claims. For illustrating these principles there is disclosed in the drawings a tank having an upright flat front wall 12 which may be any uniplanar member that is transparent throughout its area as when made of glass, or which may have a smaller portion of its area made transparent to serve as a viewing window. It is within the scope of the invention that the front wall 12 may be other than flat. It might be cylindrically or spherically concave or convex outwardly of the tank.

The rear wall 14 according to these improvements comprises a back member that is curved preferably semi cylindrically and is concave inwardly of the tank. It incorporates a highly reflective or mirror surface 16 which, if wall 14 is made of transparent glass, may comprise a coating of silver on the outside convex surface of the glass. Some of the advantages of the invention may be had by facing the inner or concave surface of the rear wall 14 with a highly reflective substance such as foil or chrome plating, in which case the material of the wall need not be transparent and if desired can be metallic. In any case the mirror surface is disposed to reflect from its concave side and has its focal point back of the front member 12.

The front wall 12 and rear wall 14 have upright meeting edges which are operatively connected and separably held together at the sides of the tank by means of flexible clamping bands 18 of L-shape or inverted U-shape cross section. Each band 18 carries at each of its ends a lug 20 containing a threaded hole engaged by a tightening screw 22. Screw 22 passes through a clearance hole in a flange bracket 24 that is secured to a framing strip 26 of L-shaped cross section. Strip 26 may be continuous in length about the edges of front wall 12 and borders the edges and marginal surfaces thereof. The conventional use of an approximate ⅛″ thickness of any good aquarium cement in plastic condition as a packing filler between the edges of the tank walls and bands 18 and framing strips 26 may be resorted to for making a water tight seal at the joints. Such cements are available in the open market by the names "Everplastic" or "Aqua-Stock" cements. Figs. 4 and 7 show that the parts may be separated by a channel gasket 28 of suitably compressible, water impervious material which also serves to cushion and seal all gaps between the meeting edge of wall 14 and the margins of wall 12. Thus there is formed a leakproof seal of mechanical nature at the joints when screws 22 are tightened enabling the tank to be taken apart for cleaning and reassembled without a cementing operation. As shown in Figs. 5 and 7 the same type of construction can be employed to hold together with waterproof tightness the floor wall or bottom member 13 of the tank and the bottom edges of the front wall 12 and rear wall 14. The floor wall 13 may be a plate of any suitable material impervious to water such as slate and should be sufficiently rigid to support the weight of the water and the underwater contents of the tank without giving way. A running length of channel gasket 27 straddles the bottom and top edges of rear wall 14.

From the foregoing description it will be apparent that the floor and walls of the tank can readily be taken apart for cleaning or repair by merely loosening the four screws 22.

Figs. 5 and 6 indicate graphically a pattern of optical performance of refracted and reflected rays of light which emanate from a source of illumination 30 stationed over the surface of the water and whose location may be central from side to side of the plan area of the tank and preferably somewhat nearer the viewing wall 12 than the reflective wall 14. An artificial source of illumination is represented by an ordinary electric light bulb supported at the end of a flexible goose neck 31 and equipped with a bowl-shaped reflective shade 33.

In Fig. 5 lines 32 represent rays of light emanating from source 30 to points where they strike the top surface of the tank contained body of water. The forwardly cast slanting rays 32 are deflected in more of a downward direction by refraction as they extend on through the water as indicated at 35. Lines 34 represent the direction in which the rearward slanting rays 32 are deflected, first by refraction on their way to the curved mirror 16 through the body of water and then by reflection forward from mirror 16 through the body of water in directions 36. Thus none of the illuminative rays 34, 35 or 36 are directed through the transparent front wall 12 of the tank into the eyes of the observer. From Fig. 5 it is seen that in any given vertical plane containing the light source 30 the greater part of the rays from the light source become cast toward a forward position at the floor of the tank after refraction and reflection. Since there are an infinite number of such vertical planes angularly related as represented by the lines P in Fig. 6 and of planes P' containing light rays reflected from planes P, there results a maximum concentration of focusing of most of the illuminative light rays from lamp bulb 30 at a localized spot near the front central bottom portion of the tank designated as the "bright zone" in Fig. 6. The radially farther backward portions of the contents of the aquarium will be less intensely illuminated as in the arcuate regions termed "dull zone" and "dim zone" in Fig. 6. Of course these so called "zones" have no sharp dividing line but merge gradually into one another as to degrees of brilliance.

Fig. 6 further illustrates that brilliant objects in the background of the observer such as daylight from window lights as well as the image of the observer himself are prevented from being reflected back through the transparent front wall 12 of the tank in directions to be seen by the eyes of the observer. This is because all such rays are deflected sidewise when reflected by the concave contour of the mirrored surface 16 in the tank. Such rays of incidence are designated 38 in Fig. 6 while the corresponding reflected rays are indicated by lines 40. Therefore the observer does not see his own image or any objects in his background reflected from the mirror or conflicting in his vision with any of the illuminated contents of the tank.

The reflecting wall 14 can have various surface curvatures other than concavely cylindrical and may be divided instead into a multiplicity of adjoining angularly related wall sections with flat faced mirroring surfaces each tangent to a continuously concave curvature, but a cylindrical shape lends itself to economic manufacture and is believed to produce a maximum number of the benefits hereinbefore discussed as advantages of the invention. The reflective surface need not be on the back wall of the tank but may be carried on a partition separated from the back wall fixed to upstand in the tank submersed in the water.

The beforementioned objective of glamorizing and making more enchanting the scenic effect in an aquarium is attained by the absence of transparency in other than the front wall of the tank, the baffling of reflection of objects outside the tank into the eyes of the observer, and the deepening obscurity of the tank contents at receding distances from the transparent front wall of the tank coupled with concentration of illumination intensified through the water at a front bottom position of the tank interior.

The appended claims are directed to and intended to cover such variants of the exact shapes, arrangements and material of the parts herein illustrated and described as come with the broadest interpretation of the wordings of the claims.

I claim:

1. An aquarium tank comprising a bottom member, a front member of substantially uniplanar transparent material, a back member of substantially cylindrical curvature having a lower edge operatively connected to said bottom member and end edges operatively connected to said front member, said back member having a mirror surface disposed to reflect from its concave side and having its focal point back of said front member.

2. An aquarium tank as defined in claim 1, together with a spot source of illumination stationed over the plan area of the tank that is bounded by the said front and back members in position to cast rays downward into the tank from above the water level therein.

3. An aquarium as defined in claim 1, together with releasable fastening means connecting together the said front member and the said end edges of the said back member in separable manner.

4. An aquarium as defined in claim 3, together with water tight sealing means interposed between the said front member and the said end edges of the said back member.

References Cited in the file of this patent

UNITED STATES PATENTS

| | | |
|---|---|---|
| 22,019 | Davis | Nov. 9, 1858 |
| 2,213,868 | Lucian | Sept. 3, 1940 |
| 2,293,612 | Montague | Aug. 18, 1942 |